United States Patent Office 2,809,982
Patented Oct. 15, 1957

2,809,982
TRIS(1-ETHYNYL-CYCLOHEXYL) PHOSPHITE

Fred J. Lowes and Roger F. Monroe, Midland, Mich., assignors to The Dow Chemical Company, Midland, Mich., a corporation of Delaware No Drawing. Application August 2, 1956,
Serial No. 601,647

1 Claim. (Cl. 260—461)

This invention relates to the compound tris(1-ethynyl-cyclohexyl) phosphite having the formula

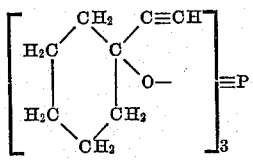

This compound is a crystalline solid, somewhat soluble in many organic solvents and of very low solubility in water. It has been found to be active as a plant growth control material and is adapted to be employed as an active toxic constituent in dust and spray compositions for the control of the growth of weeds and for the sterilization of soil with regard to plant growth. The compound is also useful as a parasiticide and as a corrosion inhibitor in acid solutions.

The new compound may be prepared by the reaction phosphorus trichloride with 1-ethynyl-cyclohexanol having the formula

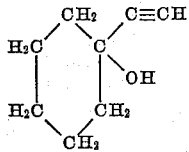

The reaction is carried out in the presence of a hydrogen chloride acceptor such as pyridine and takes place smoothly at the temperature range of from 0° to 25° C. with the formation of the desired product and pyridine hydrochloride of reaction. Good results are obtained when employing at least three molecular proportions each of pyridine and 1-ethynyl-cyclohexanol with each molecular proportion of phosphorus trichloride. The reaction conveniently may be carried out in the presence of an inert organic solvent such as ether, benzene or toluene. Upon completion of the reaction, the desired product is separated in conventional fashion.

In carrying out the reaction, the phosphorus trichloride is added portionwise to a mixture of 1-ethynyl-cyclohexanol and pyridine. The addition is carried out with stirring and at a temperature of from 0° to 25° C. Upon completion of the reaction, the reaction mixture is washed with water to separate pyridine hydrochloride and obtain the desired tris(1-ethynyl-cyclohexyl) phosphite product as a crystalline solid. This product may be purified by recrystallization from organic solvents.

In a representative operation, a solution of 137 grams (1.0 mole) of phosphorus trichloride in 90 milliliters of diethyl ether was added portionwise with stirring to a solution of 372 grams (3.0 moles) of 1-ethynyl-cyclohexanol in 360 grams of pyridine and 600 milliliters of diethyl ether. The addition was carried out over a period of 4 hours and at a temperature of from 0° to 10° C. Following the addition, stirring was continued for 16 hours to complete the reaction. The reaction mixture was then filtered to separate pyridine hydrochloride, and the solvent recovered from the filtrate by evaporation under reduced pressure. As a result of these operations, there was obtained as a solid residue a tris(1-ethynyl-cyclohexyl) phosphite product which upon recrystallization from petroleum ether (boiling at 60°–90° C.) melted at 80°–81° C. This product contained 72.13 percent carbon, 8.41 percent hydrogen and 7.58 percent phosphorus compared to the calculated values of 72.00 percent, 8.25 percent and 7.75 percent respectively.

Tris(1-ethynyl-cyclohexyl) phosphite is effective as a herbicide and parasiticide. For such use the compound may be dispersed on an inert finely divided solid and employed as a dust. Alternatively, it may also be dispersed in water and employed as a spray. The new compound may likewise be employed as a constituent of oil-in-water emulsions with or without a wetting, dispersing or emulsifying agent. In representative operations 100 percent controls of the growth of the seeds and emerging seedlings of radish, millet and wild oats have been obtained with tris(1-ethynyl-cyclohexyl) phosphite when applied at the rate of 50 pounds per acre to soil previously planted with the named seed species.

We claim:
Tris(1-ethynyl-cyclohexyl) phosphite.

No references cited.